June 10, 1930.   G. F. CROWLEY ET AL   1,763,136
INSULATING HEAD FOR EXTRUSION MACHINES
Filed June 27, 1927
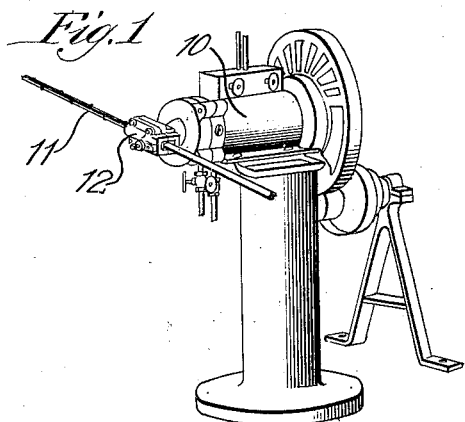
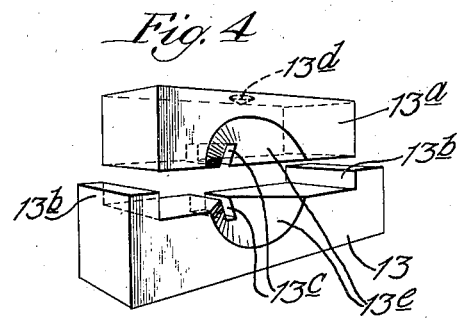
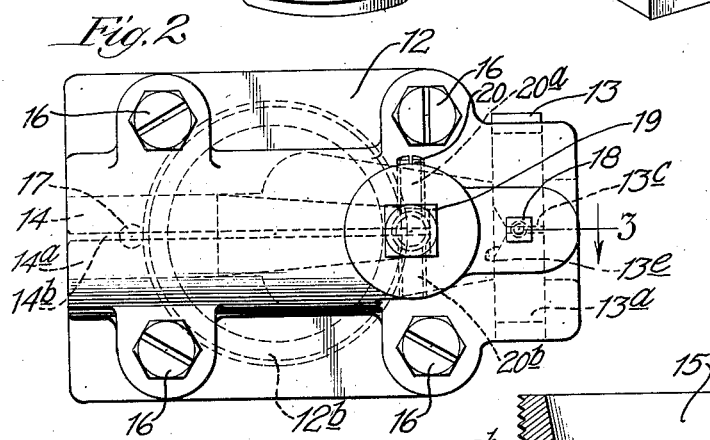
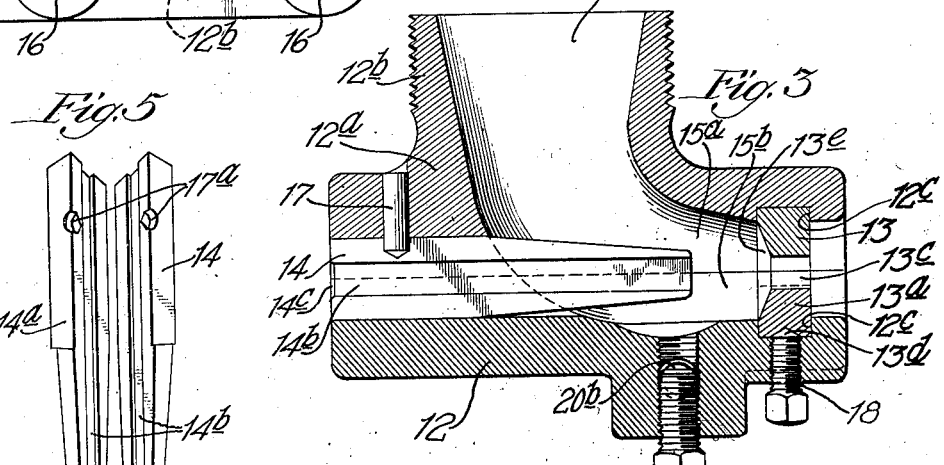
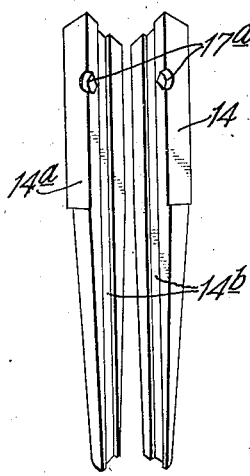

Patented June 10, 1930

1,763,136

UNITED STATES PATENT OFFICE

GUY F. CROWLEY, OF MILFORD, CONNECTICUT, AND ROBERT C. PIERCE, OF NILES, MICHIGAN, ASSIGNORS TO NATIONAL STANDARD COMPANY, OF NILES, MICHIGAN, A CORPORATION OF MICHIGAN

INSULATING HEAD FOR EXTRUSION MACHINES

Application filed June 27, 1927. Serial No. 201,792.

This invention relates to improvements in insulating heads for extrusion machines such as are used, for example, for insulating or covering wires, tire bead reenforcing elements, and the like.

One of the features of the invention is the provision of such a head that is separable, so that the die, baffle, and entire head can be removed from between the ends of the wire or other member being covered without cutting the same. To this end, die, baffle, and entire head are made separable so that the same may be disassembled and removed from around the wire, thus permitting replacement, cleaning, repairing, and substitution of parts without cutting the wire or other member being covered.

Other features and advantages of the device will appear more fully as described in the following specification.

In that form of device embodying that feature of the invention shown in the accompanying drawings, Fig. 1 is a view in perspective of an extrusion machine with the improved head attached; Fig. 2 is a view of the head in side elevation; Fig. 3 is a view taken as indicated by the line 3 of Fig. 2; Fig. 4 is a view in perspective of the die; and Fig. 5 is a similar view of the baffle.

As shown in the drawings, the head is adapted for attachment to an ordinary extrusion machine indicated in the drawing by 10. 11 indicates a member being insulated or covered, such as, for example, a wire re-enforcing element for a tire bead or the like. As here shown, for example, the member 11 consists of three wires bonded together by a thinner wire woven back and forth. These three wires constitute a re-enforcing element for a tire bead and are being covered by a rubber compound. Such re-enforcing elements frequently come in great lengths and during the covering process at times it is necessary to remove the head from the member for replacement, repairing, or other purposes. After a time, for example, the die may become worn, so that it must be replaced. In the use of the invention, such replacement and repairs may be made without cutting the member 11. The entire head, including the die and the baffle are made of two parts, which are separable, so that they all may be taken off and put back without cutting the member 11.

The insulating head includes primarily the casing 12, a die 13, and a baffle 14, each of these elements being formed of two parts indicated by 12, 12$^a$; 13, 13$^a$; and 14, 14$^a$, respectively, which parts are separable to permit removal as explained above.

The casing includes the part 12$^a$, which consists of a threaded tubular piece 12$^b$ adapted for attachment to the extrusion machine to receive the insulating composition, rubber compound, or other substance with which the member 11 is to be covered. The outer end of the tubular piece 12$^b$ terminates in a substantially rectangular flat plate 12$^a$. 15 indicates the aperture in piece 12$^b$ through which the rubber compound passes and this aperture leads to a depression 15$^a$ in the plate 12$^a$. 12 indicates a substantially rectangular complementary plate adapted to be fastened to the plate 12$^a$ by means of the machine screws 16 to hold two plates together to complete the casing 12. The plate 12 over the casing is provided with a recess 15$^b$ complementary to 15$^a$ in the other plate 12$^a$ to conduct the rubber compound.

The casing 12, when the two parts are fastened together, is adapted to support the baffle 14 consisting of the two parts 14 and 14$^a$. To this end, the plates 12 and 12$^a$ are provided with cooperating grooves adapted to embrace the baffle, as shown in Fig. 3 when the parts are assembled. The two grooves together form an opening just large enough to hold the two parts 14 and 14$^a$ so that the two parts are held together when placed in the casing. A dowel-pin 17 is provided in the plate 12$^a$ and its end registers in the depression 17$^a$ in the two parts 14 and 14$^a$ to prevent longitudinal displacement of the baffle.

The two parts 14 and 14$^a$ of the baffle are provided with cooperating longitudinal grooves 14$^b$, which together form the aperture in the baffle through which the member 11 passes during the covering operation. At the end where the member 15 enters, the ends of the parts 14 and 14ª are preferably partly chamfered as indicated by 14ᶜ.

The die consisting of the two parts 13 and 13ª is best shown in Fig. 4. It will be seen that these two parts are substantially in the shape of elongated bars square in cross section, one being slightly longer than the other and provided with two legs 13ᵇ at its ends adapted to embrace the shorter one. The two members 13 and 13ª are provided with grooves 13ᶜ adapted to form the aperture through the die when the parts are assembled, through which the wire or member 11 passes. The two plates 12 and 12ª of the casing are provided with transverse grooves 12ᶜ adapted to receive the die parts 13 and 13ª when the casing is assembled and their lateral displacement is prevented by a set screw 18, the end of which is adapted to seat in a depression 13ᵈ in die part 13ª.

The die parts 13 and 13ª are provided on their inner faces with conical depressions indicated by 13ᵉ surrounding the aperture 13ᶜ. In the operation of the device the plate 12 may be removed from the casing and the die parts 13 and 13ª and the baffle parts 14 and 14ª separated and removed from the member 11 without disturbing the same. Likewise, the same or different dies and baffles may be put back in place and the casing again joined to support the same by fastening the plate 12 in place. When assembled, the head operates in a well known manner, that is, the member 11 to be coated or covered moves through the baffle and die from left to right (as viewed in Fig. 3) and the covering compound is forced through the aperture 15, so that as the member issues from the aperture 12ᶜ in the die 13, it is covered by such compound.

19 indicates a pressure relief screw extending through the plate 12 and perpendicular to threaded holes 20ª and 20ᵇ which are adapted to receive set screw 20. With the insulating head in position as shown in the drawing the hole 20ª relieves pressure of the rubber inside recess 15ᵇ, the amount of pressure relief depending upon the amount of adjustment of screw 19. If it be necessary for the die parts 13 and 13ª to be at the left, instead of the right, as shown in Fig. 2, set screw 20 will then be placed in hole 20ᵇ, and hole 20ª will act as a relief. In either case set screw 20 will always be in an upright position and will be readily accessible.

Special attention is called to the shape of the split baffle, its protrusion into the extrusion chamber allowing the semi-fluid compound to surround the material to be insulated and at the same time protect the material to be insulated from the extrusion force of the insulating material, and at the same time serve as a guide for the material which is to be insulated.

While we have shown and described but a single embodiment of our invention, it is to be understood that it is capable of many modifications. Changes, therefore, in the construction and arrangement may be made without departing from the spirit and scope of the invention as disclosed in the appended claim, in which it is our intention to claim all novelty inherent in our invention as broadly as possible in view of the prior art.

What we claim as new, and desire to secure by Letters Patent, is:

In combination with an extrusion machine; a head adapted to have a wire passed through the same substantially transversely to the extrusion machine, said head comprising, a baffle provided with an aperture, said baffle being separable throughout the length of said aperture, a die provided with an aperture, said die being separable throughout the length of said aperture, and a separable casing provided with an aperture adapted to receive coating material from the extrusion machine, said separable casing adapted to support said separable baffle and said separable die, whereby, the casing, baffle, and die, may be separated to permit removal of a wire therefrom.

In testimony whereof, we have hereunto set our hands this 15th day of June, A. D 1927.

GUY F. CROWLEY.
ROBERT C. PIERCE.